United States Patent [19]

Zierhut

[11] Patent Number: 4,625,113
[45] Date of Patent: Nov. 25, 1986

[54] MOTION DETECTOR HAVING SENSING MEANS WHICH DETERMINE THE SHAPE OF THE FIELD OF SENSITIVITY

[75] Inventor: Hermann Zierhut, Munich, Fed. Rep. of Germany

[73] Assignee: Richard Hirschmann Radiotechnisches Werk, Esslingen am Neckar, Fed. Rep. of Germany

[21] Appl. No.: 706,756

[22] Filed: Feb. 28, 1985

[30] Foreign Application Priority Data

Feb. 29, 1984 [DE] Fed. Rep. of Germany ....... 3407426

[51] Int. Cl.⁴ .............................................. G01P 13/00
[52] U.S. Cl. ..................................... 250/338; 250/342; 250/349
[58] Field of Search ................. 250/342, 349, 338 PY, 250/338 R; 340/567, 565, 600

[56] References Cited

U.S. PATENT DOCUMENTS 4,377,808  3/1983  Kao ..................................... 340/527

FOREIGN PATENT DOCUMENTS 2728894  1/1979  Fed. Rep. of Germany ...... 250/342
1484682  9/1977  United Kingdom ............... 250/349

Primary Examiner—Janice A. Howell
Assistant Examiner—Constantine Hannaher
Attorney, Agent, or Firm—Robert J. Koch

[57] ABSTRACT

A motion detector with at least one sensor to receive electromagnetic radiation, in particular in the infrared range, from a radiation receiver surrounding a monitored object at least partially, and with an evaluating circuit to trigger a control signal upon a change in the intensity of the radiation. A motion detector of this type may be manufactured cost effectively and is suitable for the reception of electromagnetic radiation from an angular range of up to 360° of closed fields of sensitivity because the closed field or fields of sensitivity are formed by the shape of the sensor or sensors. In an embodiment of the invention that is particularly secure from interference, two sensors operating in a push-pull manner are provided, the fields of sensitivity of which are successive to each other in a path to the optical device, whereby the evaluating circuit emits a control signal only when within a predetermined period of time both a positive and a negative voltage pulse are present at the outlet of the radiation receiver.

18 Claims, 4 Drawing Figures

MOTION DETECTOR HAVING SENSING MEANS WHICH DETERMINE THE SHAPE OF THE FIELD OF SENSITIVITY

BACKGROUND OF THE INVENTION

This invention concerns a motion detector for the monitoring or control of objects with at least one sensor for the reception of electromagnetic radiation, in particular in the infrared range, from a radiation receiver having a field of sensitivity surrounding the object in an at least partially closed manner, together with an evaluating circuit to trigger a control signal in case of a change in radiation intensity.

Devices of this type, known in practice and having the configuration of passive infrared motion detectors, are used for example as sensing units in door openers, wherein the field of sensitivity of a single sensor of the motion detector located above the door extends to cover an angular range of 180° around the door to be opened. The closing of the door is effected when, within a certain period of time, there is no further change in the radiation intensity within the aforementioned field of sensitivity. In this configuration, the field of sensitivity is produced by means of an expensive multimirror optical assembly, which renders the device about as costly as the radar devices also known for this purpose. Furthermore, no completely closed field of sensitivity may be produced by these devices, which have a maximum angular range of up to 180°, so that the known motion detector is unsuited to numerous practical applications.

SUMMARY OF THE INVENTION

It is the object of the invention to provide, at the lowest possible expenditure, a cost effective motion detector of the aforementioned type, making possible a closed field of sensitivity within an arbitrary angular range.

This object is attained by providing sensors for which the closed fields of sensitivity are formed by the shape of the sensors themselves. Using sensors of this type, which may be mass produced at a relatively low cost, it is possible, when employing simple, cost effective optical means, to obtain uninterrupted fields of sensitivity in an angular range of up to 360°, thereby satisfying all needs encountered in actual practice.

When using a single field of sensitivity however, the risk of interference by common-mode noise is relatively high. For example, solar radiation or hot air coming from a door, or passers-by who intend only to pass by the object (for example a door or a machine) to be monitored, but in their course walk through the field of sensitivity, may undesireably trigger a control signal, for example, to open doors or activate or deactivate a machine. It is therefore advantageous, according to a further embodiment of the invention, to use two push-pull sensors, having fields of sensitivity extending successively in the direction of the object, with the evaluating circuit emitting a control signal only if, within a variable predetermined period of time, both fields of sensitivity are traversed in succession.

Appropriately, the preferably parallel distance of the fields of sensitivity and the duration of the control criterion are such that even in the case of an oblique passage of the object to be monitored (for example past the door in the direction of an adjacent entrance or display window) no control signal is produced, except when a person approaches the object directly. In addition, the distances of the fields of sensitivity from the object to be monitored are set so that the control process involved (for example, the opening of the door) is executed with certainty before the person reaches the object.

By means of this simple but effective control criterion, optimum security against false signal emissions may be obtained, as a signal sequence of this type due to unintended interference factors occurs very infrequently. At the same time, the probability that all movements intended to trigger a control pulse will be detected is extraordinarily high.

Advantageous forms of embodiment of the sensors include an annular configuration which is capable of comprising any angular range and may be circular, rectangular or polygonal.

In the case of configuration of two sensors which are dissimilar, it is preferable to provide a rectangular, square, circular or elliptical inner sensor, surrounded by an annular sensor of a corresponding shape, wherein the rectangular or polygonal forms are preferred for manufacturing reasons, as they may be assembled of inexpensive partial segments into practically any configuration.

More particularly, the present invention pertains to a motion detector for controlling an object comprising sensing means for sensing radiation from a field of sensitivity at least partially surrounding said object and an evaluating circuit responsive to said sensing means for generating a control signal in response to a change in the intensity of the radiation, the field of sensitivity having a shape which is determined by the shape of the sensing means.

In a further embodiment of the invention, the sensing means comprise a first sensor adapted to sense radiation from a first part of the field of sensitivity and a second sensor adapted to sense radiation from a second part of the field of sensitivity, the first and second sensors having equal areas, with said first and second parts being arranged so that a moving object approaching the object being controlled must traverse both the first and second areas in succession in order to reach the object being controlled, the first sensor being adapted to produce a first sensor signal when the sense level of radiation in the first part changes, the second sensor being adapted to produce a second sensor signal when the sensed level of radiation in the second area changes, the evaluating circuit being adapted to emit said control signal only upon receipt of both the first and second sensor signals within a predetermined time.

BRIEF DESCRIPTION OF THE DRAWINGS

These and other features and advantages of the present invention will be more fully appreciated from the following description read in conjunction with the following drawings, in which.

DETAILED DESCRIPTION OF THE PREFERRED EMBODIMENTS

Figure 1:
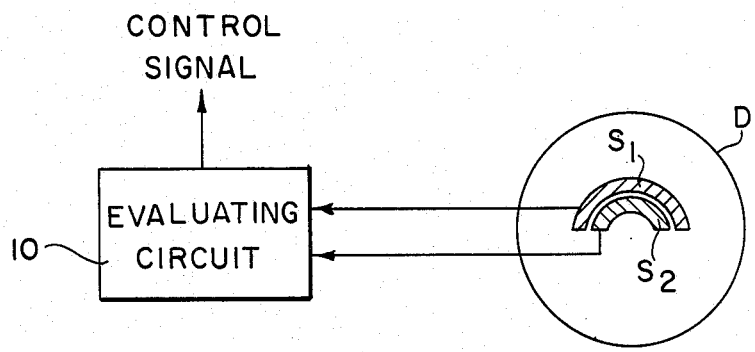
FIG. 1 is a diagram of the layout of a sensor arrangement according to a first embodiment of the present invention.

FIG. 1 shows diagrammatically a typical layout for a motion detector according to the present invention. The sensing means in this embodiment comprise an annular first sensor $S_1$ arranged adjacent an annular second sensor $S_2$. First sensor $S_1$ is such that it has a field of sensitivity $G_1$ (see FIG. 2) which is shaped congruently with first sensor $S_1$. Similarly, second sensor $S_2$ has a field of sensitivity $G_2$ which is shaped congruently with second sensor $S_2$. The relative positions and arrangement of fields of sensitivity $G_1$ and $G_2$ correspond to the relative positions and arrangements of first and second sensors $S_1$ and $S_2$.

First and second sensors $S_1$ and $S_2$ are preferably infrared sensors. Thus, first sensor $S_1$ senses a change in the level of infrared radiation in field of sensitivity $G_1$ and outputs a first sensor signal indicative thereof. Similarly, second sensor $S_2$ senses any change in the level of infrared radiation received from field of sensitivity $G_2$ and outputs a second sensor signal indicative thereof.

Evaluating circuit 10 is arranged to receive the first and second output signals and to output a control signal when the first and second output signals satisfy a predetermined requirement. In a preferred embodiment, the interval between receipt of the first and second sensor signals must be less than a predetermined threshold.

Figure 2:
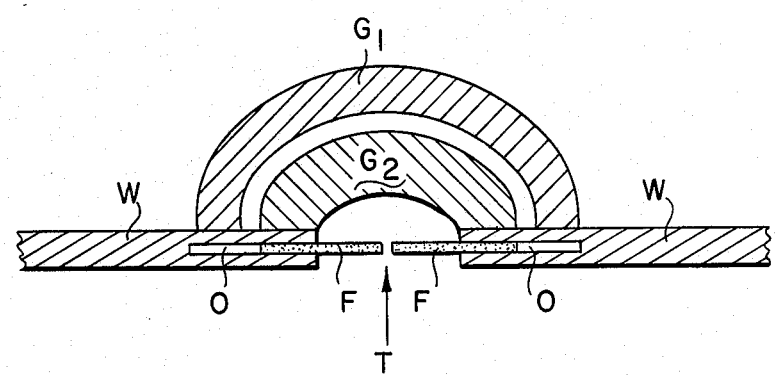
FIG. 2 is a diagram of the fields of sensitivity of the sensor arrangement shown in FIG. 1 as it might be used as the sensing unit of a door opener.

FIG. 2 shows the fields of sensitivity produced by a motion sensor used as the sensing unit in a door opener. It is to be understood that this application is for the purposes of illustration only, and that a motion sensor according to the present invention would also be useful as a sensing unit in practically any circumstance in which motion detection is desired. In the layout diagrammed in FIG. 2, a passive infrared motion detector (not shown) is arranged above the door T to be monitored, the door T consisting of two panels F that may be inserted into the orifices O of a wall W. The motion detector has two sensors which respectively cover two fields of sensitivity $G_1$ and $G_2$.

Figure 3:
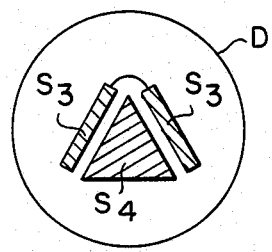
FIG. 3 is a diagram of the layout of a sensor arrangement according to a second embodiment of the subject invention.
Figure 4:
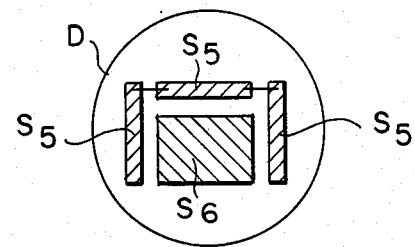
FIG. 4 is a diagram of the layout of a sensor arrangement according to a third embodiment of the subject application.

All three embodiments of the detector D use a pair of two equal-area sensors. These pairs are: $S_1$, $S_2$ (FIG. 1); $S_3$, $S_4$ (FIG. 3); and $S_5$, $S_6$ (FIG. 4). In a preferred embodiment the members of each pair are interconnected in a push-pull circuit. They affect a control signal produced in an evaluating unit 10, to open the door T only if they emit successively within a period of time adjustable in the evaluating unit in a known manner, an output signal (positive and negative) as the result of a change in the radiation intensity caused by a passage through the fields of sensitivity $G_1$, $G_2$.

The fields of sensitivity $G_1$, $G_2$ are closed in an angular range of 180° around the door T and are obtained on the basis of a corresponding shape of the sensors $S_1$, $S_2$ of the detector D shown in FIG. 1.

This configuration provides in a simple and cost effective manner a door opener highly secure against interference, because on the one hand common mode interference, for example that caused by warm air from a building, is prevented and on the other, the door is opened in practice only if someone traverses both fields of sensitivity $G_1$, $G_2$ directly in the direction of the door T. Persons who merely pass by the door and traverse only the field of sensitivity $G_1$, do not trigger the door opener, in contract to devices with only one field of sensitivity.

Furthermore, the door opener may be produced cost effectively in series by using an inexpensive optical assembly. Manufacturing is particularly simple and inexpensive in the case of an embodiment comprising straight sensors, as shown as examples in FIGS. 3 and 4. The form and the distance of the two sensors $S_1$ to $S_6$ are chosen so that the distance of the fields of sensitivity $G_1$, $G_2$ from the door T represents a compromise favorable for practical purposes between timely opening to avoid injuries on the one hand, and frequent unintentional openings on the other.

What is claimed is:

1. A motion detector for controlling an object comprising:

sensing means for sensing radiation from a field of sensitivity at least partially surrounding and enclosing said object; and an evaluating circuit responsive to said sensing means for generating a control signal in response to a change in the intensity of said radiation, said field of sensitivity having a shape which is determined by the shape of said sensing means.

2. A motion detector as claimed in claim 1, wherein said sensing means have an annular form.

3. A motion detector as claimed in claim 1, wherein said sensing means is adapted to sense infrared radiation.

4. A motion detector as claimed in claim 1, wherein said sensing means comprise two sensors having equal areas and differing configurations.

5. A motion detector as claimed in claim 4, wherein said two sensors comprise one sensor which is triangular and another which comprises two rectangular sections placed respectively adjacent and parallel to two sides of said triangular sensor.

6. A motion detector as claimed in claim 4, wherein said two sensors comprise one sensor which is rectangular and another which comprises three rectangular sections arranged respectively adjacent and substantially parallel to three sides of said rectangular sensor.

7. A motion detector as claimed in claim 1, wherein said sensing means comprise:

a first sensor adapted to sense radiation from a first field of sensitivity; and a second sensor adapted to sense radiation from a second field of sensitivity;

said first and second sensors having equal areas, said first and second fields of sensitivity being arranged so that a moving object approaching said object being controlled must traverse both said first and second fields in succession in order to reach said object being controlled;

said first sensor being adapted to produce a first sensor signal when said the sensed level of radiation in said first field changes;

said second sensor being adapted to produce a second sensor signal when the sensed level of radiation in said second field changes;

said evaluating circuit being adapted to emit said control signal only upon receipt of both said first and second sensor signals within a predetermined time of each other.

8. A motion detector as claimed in claim 7, wherein said first sensor and second sensors have an annular form.

9. A motion detector as claimed in claim 7, wherein said first and second sensors are adapted to sense infrared radiation.

10. A motion detector as claimed in claim 7 wherein said first sensor has a configuration which differs from that of said second sensor.

11. A motion detector as claimed in claim 10, wherein said first sensor is triangular and said second sensor has two rectangular sections placed respectively adjacent and parallel to two sides of said first sensor.

12. A motion detector as claimed in claim 10, wherein said first sensor is rectangular and said second sensor comprises three rectangular sections arranged respectively adjacent and substantially parallel to three sides of said first sensor.

13. A motion detector as claimed in claim 7, wherein said first sensor signal, which said first sensor is adapted to produce, comprises a positive voltage pulse, and said second sensor signal which said second sensor is adapted to produce comprises a negative voltage pulse.

14. A motion detector as claimed in claim 13, wherein said first sensor and second sensors have an annular form.

15. A motion detector as claimed in claim 13, wherein said first and second sensors are adapted to sense infrared radiation.

16. A motion detector as claimed in claim 13, wherein said first sensor has a configuration which differs from that of said second sensor.

17. A motion detector as claimed in claim 16, wherein said first sensor is triangular and said second sensor has two rectangular sections placed respectively adjacent and parallel to two sides of said first sensor.

18. A motion detector as claimed in claim 16, wherein said first sensor is rectangular and said second sensor comprises three rectangular sections arranged respectively adjacent and substantially parallel to three sides of said first sensor.

* * * * *